(12) United States Patent
Feige et al.

(10) Patent No.: US 7,537,591 B2
(45) Date of Patent: *May 26, 2009

(54) METHOD AND DEVICE FOR MONITORING THE ENERGY AND/OR THE POSITION OF A PULSED AND SCANNED LASER BEAM

(75) Inventors: Torsten Feige, Jena (DE); Claus Goder, Nuremberg (DE); Thomas Hollerbach, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 136 days.

This patent is subject to a terminal disclaimer.

(21) Appl. No.: 11/693,326

(22) Filed: Mar. 29, 2007

(65) Prior Publication Data

US 2007/0250049 A1 Oct. 25, 2007

Related U.S. Application Data

(63) Continuation of application No. 10/276,345, filed as application No. PCT/EP01/05638 on May 17, 2001, now Pat. No. 7,211,078.

(30) Foreign Application Priority Data

May 17, 2000 (DE) .............................. 100 24 079

(51) Int. Cl.
*A61B 18/18* (2006.01)

(52) U.S. Cl. ................................ 606/11; 606/4; 606/10

(58) Field of Classification Search .................. 606/4–6, 606/10–13

See application file for complete search history.

(56) References Cited

U.S. PATENT DOCUMENTS

| 4,404,571 | A | | 9/1983 | Kitamura | 346/108 |
|---|---|---|---|---|---|
| 4,459,986 | A | * | 7/1984 | Karaki | 606/11 |
| 4,675,501 | A | | 6/1987 | Klingel | 219/121 |
| 4,820,916 | A | * | 4/1989 | Patriquin | 250/227 |
| 5,048,969 | A | * | 9/1991 | Deason et al. | 356/432 |

(Continued)

FOREIGN PATENT DOCUMENTS

DE 19727573 5/1998

(Continued)

OTHER PUBLICATIONS

Scientech Laser Power Meters, http://www.scientech-inc.com/LPM/
Swamp Optics, http://www.swampoptics.com/tutorials.html.*

(Continued)

*Primary Examiner*—Ahmed M Farah
(74) *Attorney, Agent, or Firm*—Darby & Darby

(57) ABSTRACT

A method for measuring at least one of an energy and a position of a pulsed laser beam, notably in an ophthalmologic excimer laser. The pulsed laser beam is intermittently directed at a sensor, which measures its energy and/or position. In addition, a device for measuring at least one of an energy and a position of a pulsed laser beam. The device includes a sensor configured to measure at least one of the energy and the position of the pulsed laser beam, and a beam deflection device, which is configured to guide the pulsed laser beam and to intermittently direct the pulsed laser beam at the sensor.

16 Claims, 1 Drawing Sheet

U.S. PATENT DOCUMENTS

| | | | | |
|---|---|---|---|---|
| 5,076,663 | A * | 12/1991 | Arendt et al. | 359/884 |
| 5,263,951 | A * | 11/1993 | Spears et al. | 606/12 |
| 5,444,239 | A | 8/1995 | Nacman et al. | 250/235 |
| 5,523,837 | A * | 6/1996 | Prozzo | 356/218 |
| 5,601,737 | A | 2/1997 | Asahi et al. | 219/121.66 |
| 5,609,780 | A * | 3/1997 | Freedenberg et al. | 219/121.73 |
| 5,782,822 | A * | 7/1998 | Telfair et al. | 606/5 |
| 5,984,916 | A | 11/1999 | Lai | 606/11 |
| 5,986,252 | A * | 11/1999 | Kawamura | 250/205 |
| 6,005,243 | A | 12/1999 | Yamazaki | 250/234 |
| 6,038,051 | A | 3/2000 | Suzuki et al. | 359/204 |
| 6,099,522 | A * | 8/2000 | Knopp et al. | 606/10 |
| 6,243,405 | B1 * | 6/2001 | Borneis et al. | 372/57 |
| 6,290,695 | B1 | 9/2001 | Kuhnert et al. | 606/5 |
| 6,559,934 | B1 * | 5/2003 | Yee et al. | 356/121 |
| 6,666,855 | B2 * | 12/2003 | Somani et al. | 606/5 |
| 6,847,696 | B2 * | 1/2005 | Chinju et al. | 378/34 |
| 7,128,737 | B1 * | 10/2006 | Goder et al. | 606/10 |
| 7,211,078 | B2 * | 5/2007 | Feige et al. | 606/11 |

FOREIGN PATENT DOCUMENTS

| | | |
|---|---|---|
| EP | 0583982 | 2/1994 |
| EP | 0763762 | 3/1997 |
| EP | 0930772 | 7/1999 |
| JP | 9103893 | 4/1997 |
| WO | 9316631 | 9/1993 |

OTHER PUBLICATIONS

Trebino et al. "Measuring Ultrashort Laser Pulses," Optics & Photonics News, 23, Jun. 2001.*

Daniel J. Kane "Real-Time Measurement of Ultrashort Laser Pulses Using Principal Component Generalized Projections," IEEE Journal of Selected Topics in Quantum Electronics, vol. 4, No. 2, Mar./Apr. 1998.*

DeLong et al. "Practical Issues in Ultrashort-Laser-Pulse Measurement Using Frequency-Resolved Optical Gating," IEEE Journal of Quantum Electronics, vol. 32, No. 7, Jun. 1996.*

* cited by examiner

METHOD AND DEVICE FOR MONITORING THE ENERGY AND/OR THE POSITION OF A PULSED AND SCANNED LASER BEAM

This application is a continuation of U.S. patent application Ser. No. 10/276,345, filed on Nov. 14, 2002, now U.S. Pat. No. 7,211,078, which is a national phase application of International Patent Application No. PCT/EP/01/05638, filed on May 17, 2001. The entire disclosure of both priority applications is incorporated by reference herein.

BACKGROUND OF THE INVENTION

The present invention relates to a method and a device for monitoring the energy and/or the position of a pulsed and scanned laser beam. Specifically, the present invention relates to a method and a device for measuring the energy of a pulsed laser beam to determine the actual value for controlling the energy and, at the same time, to test the full functionality of a beam deflection unit and the alignment of the optics of an ophthalmologic excimer laser for corneal surgery.

Laser energy is measured using optical photodiodes, pyroelectric or thermophilic sensors. To this end, generally, part of the laser radiation is guided via a splitting mirror (splitter) or a glass plate to a sensor. The energy measured there is then considered to be proportional to the energy that is applied in the treatment field, according to the division ratio during the coupling out of the radiation. Here, energy losses of changing transmission conditions of the following optical system because of defective optics or increasing absorption in air are not detected or compensated for.

When working with a beam deflection unit (scanner), the proper functioning of the scanner can be accomplished by measuring the position of the scanner mirrors. In this context, the position of the mirror is determined by capacitively or optically measuring the position of the mirror support. If, in the case of this independent capacitive or optical position measurement in the scanner (closed loop), the nominal position changes, the scanner feeds back when the corresponding position is reached (position acknowledge signal). In the case of commercially available scanners, however, the position resolution of the independent position monitoring is too low so that the position acknowledge signal is not changed in the case of very small deflections or changes in the nominal position. Thus, moreover, the actual position of the laser beam cannot be determined either. If the optical beam guidance system is out of alignment, for example, due to a defective scanner mirror, this is not detected. If an error occurs during setpoint selection, for example, because of a corrupted setpoint signal due to electric disturbances or because of a missing signal due to a cable break, this cannot be detected either because the scanner automatically positions itself according to the false signal and feeds back the reached position or because the scanner maintains its old position and continues to give the false impression of a correct position.

Moreover, it is conceivable to determine the position of the laser beam by measuring an auxiliary beam in the visible range via an image sensing unit. These errors of the position monitoring of the beam deflection unit can be detected using an image-processing system in that the position of a visible aiming beam in the treatment field is measured by a camera and evaluated. The actual position can then be compared to the setpoint input. However, the potential processing speed of the laser system is limited by the image repetition rate of the camera and the relatively high dead time during image analysis. The dead time essentially depends on the processing speed or computing power of the image-processing system and further reduces the processing speed of the overall system. It is not possible to determine the energy at the same time.

SUMMARY OF THE INVENTION

Therefore, an object of the present invention is to provide a method and a device for monitoring the energy and/or position of a pulsed and scanned laser beam which allow the processing speed and/or the accuracy to be improved compared with the methods or devices of the prior art.

This objective is achieved, in particular, by a method for measuring the energy and/or the position of a pulsed laser beam (10), in which pulsed laser beam (10) is intermittently directed at a sensor (20) and the energy and/or the position of pulsed laser beam (10) is/are measured by sensor (20). A possible pulsed laser beam is preferably the beam of an ophthalmologic excimer laser. This laser is preferably pulsed at a frequency of 35 Hz to 1000 Hz, in particular, of 300 Hz. Further preferred lasers are fs-lasers and frequency-quintupled Nd.YAG laser in Q-switched mode.

Usable as the sensor is preferably an optical sensor, in particular, photodiodes, a pyroelectric sensor or a thermophilic sensor. It is particularly preferred to use pyroelectric sensors as sensor.

The sensor is preferably arranged in such a manner that it is possible to measure the energy of the occurring beam and/or to determine the position of the beam. For that purpose, the sensor is preferably equipped with several sensor fields, which makes it possible to measure the energy in the individual fields, to calculate the total energy of the beam by summation and to determine the position of the beam via the energy distribution over the different fields. A first indication of the correctness of the position is the measurement of whether the beam really impinges on the sensor or a sensor field when working with the selected alignment. It is particularly preferred to use a quadrant sensor. In this manner, the energy can be measured both in total and in the individual quadrants. Through this, in addition to the total energy, the position of the beam is determined as well.

This deflection of the beam is particularly preferably carried out intermittently, preferably periodically, this means that the entire, undivided beam is deflected in the process and not only a coupled-out component of the beam. In this manner, it is possible to measure the beam which originally acts in the treatment region and not just a beam which correlates to this beam, as is the case with the branched-off beams in the prior art. In this manner, occurring energy losses, for example, due to ozone generation in the system to the exit of the beam from the system, are detected as well.

By deflecting the laser beam onto the sensor, the proper functioning of the scanners and the entire beam position in the optical system are ensured at the same time.

In another method according to the present invention, sensor (20) is arranged inside a beam deflection device (30). By arranging the sensor inside the beam deflection device, a compact design is made possible without having to align an offset sensor. Because of this, there is no relative motion between the sensor and the laser so that no corrections are required here. It is particularly preferred for the sensor to be arranged downstream of the last optical element of the deflection device so that the energy of the measured beam is substantially equivalent to the energy of the beam in the target region.

In a further method according to the present invention, pulsed laser beam (10) is directed at sensor (20) at regular intervals. In this manner, a periodic deflection can be implemented in a simple way. Of course, it is also conceivable to change the cycle during operation, for example, to temporarily monitor more intensively at a higher cycle, which is advantageous, in particular, when treating critical regions.

The shot parameters are particularly preferably checked upon completion of each partial correction of the treatment region, in particular, of lenses. In this manner, it is possible to carry out a sequence of processing steps and to check the shot parameters only subsequently. A particularly preferred device for a process shaping of surfaces, in particular, of lenses is described in German Patent No. DE 197 27 573.

In a further method according to the present invention, pulsed laser beam (10) is directed at sensor (20) at a rate of 5 Hz to 150 Hz, preferably of 10 Hz to 50 Hz, particularly preferably of 15 Hz to 35 Hz.

Using these rates, a quasi-continuous measurement result is obtained which allows a fast response to a change of the marginal parameters. In this manner, it is possible to promptly intervene in a corrective way if the energy or the position of the beam change unintentionally.

In a further method according to the present invention, a single pulse of pulsed laser beam (10) is directed at sensor (20). By deflecting only a single beam, a defined quantity of energy can be measured and compared to measuring data of the data series measured before and afterwards. Because of this, an already clearly defined amount of energy is periodically applied to the sensor so that a further conversion can for the most part be dispensed with.

In a another method according to the present invention, every fifth to every twohundredth single pulse, preferably every fifth to fiftieth single pulse, more preferably every tenth to thirtieth single pulse, in particular, every fifteenth single pulse is directed at sensor (20). This permits a quasi-continuous measurement during which it is possible to react to a change in energy and to adapt the beam immediately. This rate is preferably established in interaction with the selected shot frequency. Moreover, this rate is preferably also established in interaction with the total number of shots that are required for the intended reshaping. When working with high pulse frequencies, it is possible to take several measured values without substantially influencing the duration of treatment. A preferred pulse frequency of 300 Hz results in a preferred rate of 1:15, i.e., every fifteenth single pulse is directed at the sensor.

In a preferred device (5) according to the present invention for measuring the energy and/or the position of a pulsed laser beam (10), including a beam deflection device (30), in particular, a scanner block, and a sensor (20), beam deflection device (30) is set up in such a manner that a pulsed laser beam (10) which is guided via the beam deflection device can intermittently be directed at sensor (20) and that the energy and/or the position of pulsed laser beam (10) can be measured by sensor (20). Such an device according to the present invention advantageously provides an apparatus for measuring the energy and/or the position of a pulsed laser beam.

In a further inventive device (5) according to the preceding claim, sensor (20) has several sensor fields (25). Because of this, it is advantageously possible to measure the energy in the individual fields, to calculate the total energy of the beam by summation and to determine the position of the beam by the energy distribution over the different fields. A first indication of the correctness of the position is the measurement of whether the beam really impinges on the sensor or a sensor field when working with the selected alignment. In this respect, it is also possible to select the shape and size of the sensor or sensor fields such that the position of the beam can be accurately determined. Preferably, the sensor can also be selected so small that, in case of a beam deviation, no signal can be measured by the sensor anymore and thus the criterion of a high beam positioning accuracy can be taken as a basis for operation.

In an ophthalmologic excimer laser (1) according to the present invention for refractive corneal surgery, excimer laser (1) features a device for measuring the energy and/or the position of a pulsed laser beam (10) according to one of the preceding apparatus claims. In this manner, it is possible to use the laser beam in this critical laser system to make operations on the human eye even safer.

BRIEF DESCRIPTION OF THE DRAWINGS

In the following, further advantageous embodiments of the present invention will be explained with reference to the drawing.

In this connection.

DETAILED DESCRIPTION

Figure 1:
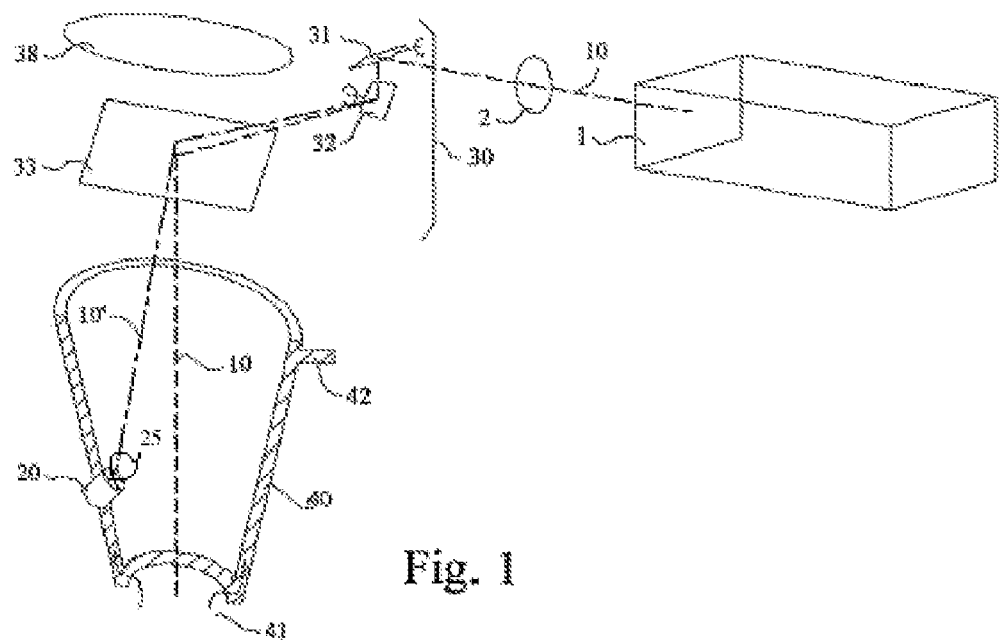
FIG. 1 shows a schematic design of a device according to the present invention for measuring the energy and/or the position of a pulsed laser beam with the sensor being integrated into a suction device.

FIG. 1 shows a schematic design of a device 5 for measuring the energy and/or the position of a pulsed laser beam 10 with the sensor being integrated into a suction device. Beam-shaping optics 2 (symbolically depicted as a single lens), a beam deflection device 30 which is composed of a first scanner mirror 31 for the x-axis and a second scanner mirror 32 for the y-axis, as well as a deflection mirror 33 are arranged downstream of a laser source, i.e., of an excimer laser 1. Upstream of the treatment region, provision is made for a suction device 40 in which ablation products 41 can be removed from the treatment region. A sensor 20 is located inside the suction device. The treatment region can be observed through the suction device via a microscope lens 38.

During operation, a laser beam 10 is generated by excimer laser 1 and directed at the deflection mirror via first scanner mirror 31 and second scanner mirror 32. From there, the beam is directed at the treatment region via suction device 40. Via microscope lens 38, the operator can now monitor the process of action of laser beam 10 in the treatment region. By moving first scanner mirror 31 and second scanner mirror 32, beam 10 is deflected to a path of laser beam 10'. This deflection is accomplished according to the previously selected parameters in just a way that deflected beam 10' impinges on sensor 20. For that purpose, in each case single pulses of the laser beam are coupled out after which first and second scanner mirrors 31 or 32 are moved back to their working position. Laser beam 10 continues to remain in the treatment region.

It is particularly advantageous that the energy of the single pulse that is measured by sensor 20 is exactly equivalent to the energy of laser beam 10 in the treatment region since this laser beam has already passed through the entire optical system so that it is not required to carry out a conversion or estimation of further losses or attenuations. Moreover, by deflecting the beam via first or second scanner mirrors 31 or 32, the functionality of beam deflection device 30 is checked at the same time since deflected beam 10' is only able to impinge on sensor 20 if the individual optical elements of beam deflection device 30 are correctly positioned and functional.

Figure 2:
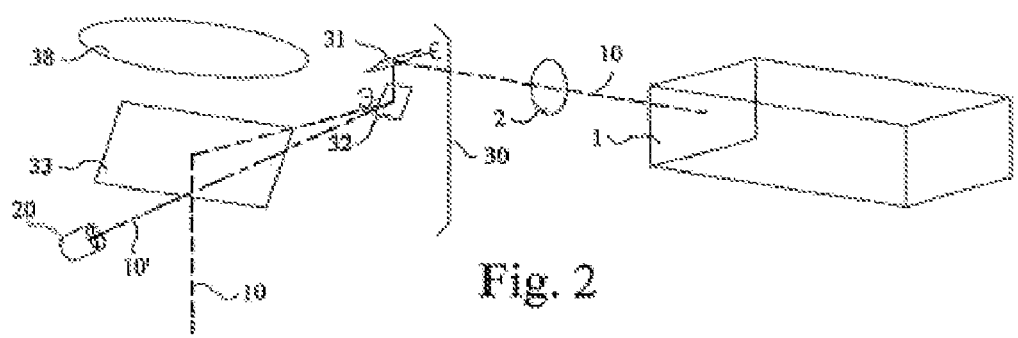
FIG. 2 shows a schematic design of a device according to the present invention for measuring the energy and/or the position of a pulsed laser beam with the sensor being positioned below the deflection mirror.

FIG. 2 shows a schematic design of a device according to the present invention for measuring the energy and/or the position of a pulsed laser beam 10 with sensor 20 being positioned below deflection mirror 33. Beam 10 can be directed at sensor 20 via mirror 32, bypassing the deflection mirror. In this manner, possible alignments of the beam with sensor 20 are eliminated because then the sensor already occupies a fixed position inside the device relative to beam deflection device 30.

Figure 3:
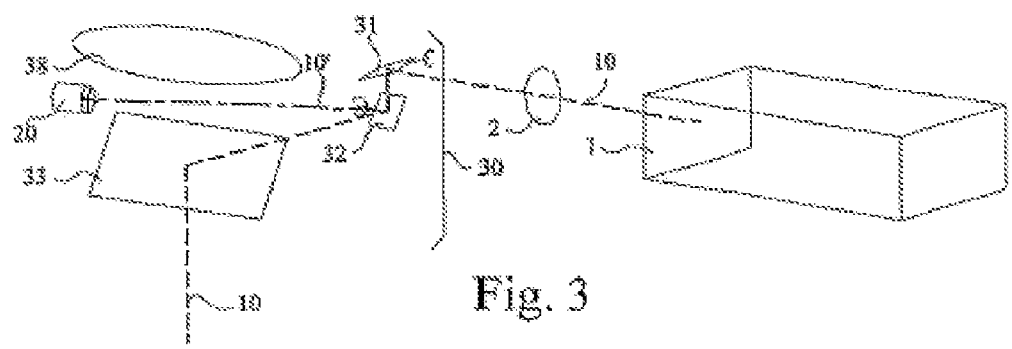
FIG. 3 shows a schematic design of a device according to the present invention for measuring the energy and/or the position of a pulsed laser beam with the sensor being positioned above the deflection mirror.

FIG. 3 shows a schematic design of a device according to the present invention for measuring the energy and/or the position of a pulsed laser beam 10 with sensor 20 being positioned above deflection mirror 33. Thus, an alternative arrangement of the sensor inside the beam deflection device is shown.

Thus, a method and a device for monitoring the energy and/or the position of a pulsed and scanned laser beam have been provided which make it possible to measure the energy of the laser beam in the target region or treatment region in a simple and reliable manner and, in addition, also to quasi-continuously check and accomplish the correct alignment of the beam deflection device.

What is claimed:

1. A device comprising:
   a laser configured to emit a pulsed laser beam;
   a beam deflection device including a plurality of optical elements; and
   a sensor disposed downstream of the plurality of optical elements,
   wherein the beam deflection device is configured to direct the pulsed laser beam through the plurality of optical elements to a treatment region and to intermittently redirect the entire pulsed laser beam from the treatment region through the plurality of optical elements to a single position on the sensor, and
   wherein the sensor is configured to determine at least one of the single position of the pulsed laser beam and an energy of the pulsed laser beam at the single position of the pulsed laser beam.

2. The device as recited in claim 1, wherein the optical elements include a scanner block.

3. The device as recited in claim 1, wherein the sensor includes a plurality of sensor fields.

4. The device as recited in claim 1, wherein the laser is an ophthalmologic laser for refractive corneal surgery.

5. The device as recited in claim 1, wherein the treatment region is an eye.

6. The device as recited in claim 1, wherein the laser is an fs-laser.

7. The device as recited in claim 1, wherein the sensor is configured to measure the single position of the pulsed laser beam and an energy of the pulsed laser beam at the single position.

8. A method for operating a laser comprising:
   directing a pulsed laser beam from a laser source to a treatment region;
   intermittently redirecting the entire pulsed laser beam from the treatment region to a single position on a sensor; and
   determining at least one of the single position of the pulsed laser beam and an energy of the pulsed laser beam at the single position using the sensor.

9. The method as recited in claim 8, wherein the sensor is disposed inside a beam deflection device.

10. The method as recited in claim 8, wherein the intermittently redirecting of the pulsed laser beam is performed at regular intervals.

11. The method as recited in claim 8, wherein the pulsed laser beam is an fs-laser beam.

12. The method as recited in claim 8, wherein the treatment region includes a human eye.

13. The method as recited in claim 8, wherein the directing of the pulsed laser beam is performed as part of a refractive corneal surgery.

14. The method as recited in claim 8, wherein the redirecting of the entire pulsed laser beam includes redirecting a series of pulses to the same single position on the sensor.

15. method as recited in claim 8, wherein the beam deflection device includes a plurality of optical elements, wherein the directing includes directing the pulsed laser beam through the plurality of optical elements to the treatment region, and wherein the sensor is disposed downstream of the plurality of optical elements so that the redirected pulsed laser beam also passes through each of the plurality of optical elements.

16. The method as recited in claim 8, wherein the determining includes determining both the single position of the pulsed laser beam and an energy of the pulsed laser beam at the single position using the sensor.

* * * * *